3,459,811
SOLUBLE, READILY POLISHABLE HARD WAXES
Kurt Blaettner and Gunther Nowy, Gersthofen, Germany, assignors to Farbwerke Hoechst Aktiengesellschaft vormals Meister Lucius & Bruning, Frankfurt am Main, Germany, a corporation of Germany
No Drawing. Filed Nov. 29, 1967, Ser. No. 686,681
Claims priority, application Germany, Dec. 16, 1966, F 50,969
Int. Cl. C07c 69/26, 69/52
U.S. Cl. 260—613                              6 Claims

ABSTRACT OF THE DISCLOSURE

Soluble, readily polishable hard waxes obtained by copolymerizing glycidyl ethers of aliphatic fatty alcohols with 16 to 30 carbon atoms with diglycidyl ethers of dihydric phenols with 6 to 15 carbon atoms.

---

The present invention relates to soluble, readily polishable hard waxes and to a process for their manufacture.

An important utilitarian property of waxes is their solubility in solvents commonly used in wax processing. Wax solutions can be sprayed and, therefore, they are better suitable for producing homogeneous protective coatings than emulsions or suspensions.

Waxes which have a good solubility and a high hardness are especially interesting since most of the known hard waxes are insolube in organic solvents and the softer waxes, which are soluble, cannot meet all requirements in use.

The combination of hardness and solubility has hitherto only been found with some polyvinyl ethers which are difficult and expensive to produce. It has also been proposed to transform glycidyl ethers of long chain aliphatic alcohols by polymerization into soluble hard waxes. The polymeric glycidyl ethers have, however, the disadvantage that the wax films obtained after evaporation of the solvent have a relatively poor gloss and are difficult to polish.

The present invention provides soluble, readily polishable hard waxes by copolymerizing, at a temperature in the range of from 30 to 200° C., glycidyl ethers of aliphatic fatty alcohols having 16 to 30 carbon atoms with 2 to 20% of their weight of diglycidyl ethers of dihydric phenols having 6 to 15 carbon atoms which may carry alkyl groups with 1 to 3 carbon atoms bound to the aromatic nucleus, using cationically or anionicaly active catalysts.

Suitable fatty alcohol glycidyl ethers are, above all, glycidyl ethers of straight chain alcohols with 16 to 30 carbon atoms, for example of cetyl alcohol, stearyl alcohol and behenyl alcohol, mixtures thereof as available, for example, in commerical grade fatty alcohols, such as tallow alcohol, and furthermore synthetic alcohols, for example alcohols obtained by the Alfol synthesis having the same molecule size.

The monomeric glycidyl ethers are produced in known manner from the alcohols by reacting them with epihalohydrins.

Suitable diglycidyl etthers are those of dihydric phenols with 6 to 15 carbon atoms which may carry alkyl groups with 1 to 3 carbon atoms bound to the aromatic nucleus. There can be used diglycidyl ethers of mononuclear phenols, for example hydroquinone, resorcinol and pyrocatechol, as well as of polynuclear phenols or phenols with condensed nuclei, for example dihydroxy-diphenyls, dihydroxynaphthalenes, dihydroxydiphenylsulfones, dihydroxydiphenylsulfides, dihydroxydiphenylmethanes, and 2,2-bishydroxyphenylpropanes. It is likewise possible to use dihydric phenols, substituted polyphenolmethanes, dihydroxydibenzyles, dihydroxybenzophenones and aminobisphenols obtained by reacting phenols with carbonyl compounds. There can be used the monomeric diglycidyl ethers of the general formula

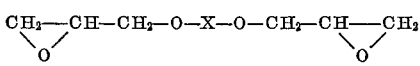

in which X stands for a bisphenol radical of the type specified above, as well as diglycidyl ether alcohols of the aforesaid bisphenols having the general formula

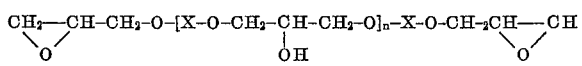

in which $n$ is a number below 2.

The diglycidyl ethers of bisphenols are prepared in known manner, advantageously from the phenols by reacting them with epichlorohydrin in the presence of basic reagents. Depending on the reaction conditions and the proportions used monomeric diglycidyl compounds or diglycidyl ether alcohols are obtained.

For the copolymerization there can be used pure glycidyl ethers as well as advantageously crude products having an epoxide content of 65 to 85% of the theory. The copolymerization is preferably carried out in substance, either at atmospheric pressure, under reduced pressure or elevated pressure. In some cases it may be advantageous to perform the reaction in the presence of inert solvents, for example ethers or hydrocarbons, such as heptane, toluene or diisopropyl ether.

The proportion of glycidyl ether to diglycidyl ether is suitably chosen in such manner that 2 to 20 and preferably 7.5 to 15 parts by weight of the latter compound is used for 100 parts by weight of the former. If a higher amount of diglycidyl ether is used undesired side reactions occur and products are obtained which are unsuitable for the intended purpose.

As catalysts there can be used cationically active catalysts of the Friedel-Crafts type, for example tin tetrachloride, antimony pentachloride and boron trifluoride, as well as the addition compounds thereof, and anionically active catalysts, preferably alkali metal hydroxides and alcoholates such as sodium methylate and potassium tert. butylate, preferably aluminum isopropylate. Still further, there may be used oxides, hydrated oxides and alkyl compounds of the elements of groups 2 and 3 of the Periodic Table, for example aluminum oxides, barium hydroxide; alkyl-aluminum and alkyl-zinc compounds which may be modified with ethers, chelating agents such as 1,3-diketones, alcohols and water. Alkali metals, the hydrides, carbonates and fatty acid salts thereof and amines and amine hydrates are also suitable.

The catalysts are used in an amount in the range of from 0.2 to 5 and preferably 2 to 3%, calculated on the weight of the glycidyl ethers.

Copolymerization is performed at a temperature in the range of from about 30 to 200° C., advantageously 50 to 100° C. The reaction is exothermic and, therefore, cooling may become necessary. It is not absolutely necessary to operate at a constant temperature. It may be expedient to raise the temperature in the course of the reaction, for example from 50° C. to 120° C.

According to a preferred embodiment of the process of the invention the catalyst is added dropwise, at 50 to 60° C., while stirring at atmospheric pressure and with superposition of nitrogen, to the molten mixture of the comonomers, and the reaction mixture is maintained at said temperature until a sample is substantially free from epoxide groups. The catalyst residues can then be removed in simple manner by neutralization and filtration or washing out.

The hard waxes produced by the process of the invention have a degree of polymerization in the range of from 2 to 12. The polymers are well soluble in balsam turpentine, gasoline and trichloro-ethylene. Their solubility is better than that of homopolymers of vinyl or glycidyl ethers of fatty alcohols. A copolymer from 30% by weight of stearylglycidyl ether and 10% by weight of 2,2'-bis-epoxy-phenylpropane diglycidyl ether yields, for example, a 30% solution in gasoline that is entirely limpid at 20° C., whereas a corresponding solution of polystearylvinyl ether or polystearyl glycidyl ether is strongly turbid and flocculent.

The wax films obtained after application of a solution of the copolymers according to the invention and evaporation of the solvent are readily polishable and have a much better gloss than wax films obtained from solutions of homopolymers of glycidyl ethers of corresponding fatty alcohols. In some cases the gloss is even superior to that of films of the corresponding polyvinyl ethers. Moreover, the claimed copolymers are distinguished by a low melt viscosity (20 to 150 centistokes depending on the proportion of diglycidyl compound) and a high flow hardness (300 to 400 kg./cm.²).

The products obtained by the process of the invention are suitable above all as polishing agents in many fields of application, for example as floor polishes, especially for stone floors, as furniture polishes or as motor-car waxes.

The following examples serve to illustrate the invention but they are not intended to limit it thereto. The flow point/drop point was determined according to DIN 51805, the viscosity was measured according to DIN 51562. The epoxide values relate to the grouping

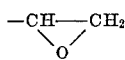

Example 1

90 grams of stearly glycidyl ether (11.5% of epoxide) and 10 grams of hydroquinone diglycidyl ether (28.7% of epoxide) were melted while stirring. During the course of about 15 minutes 0.8 milliliter of a 50% by weight solution of boron trifluoride diethyl etherate in dioxane was added at 60 to 65° C. while cooling. The reaction mixture was stirred for a further 30 minutes at 70° C. and filtered under pressure. A light, hard wax was obtained having a flow point/drop point of 45.9/46.0° C. and a viscosity of 45.2 centistokes.

Example 2

95 grams of stearyl glycidyl ether (11.5% of epoxide) 5 grams of 4,4'-dihydroxy-diphenylsulfone diglycidyl ether (22.7% of epoxide) were dissolved in 100 milliliters of toluene while stirring. During the course of about 15 minutes 1.2 milliliters of a 50% by weight solution of boron trifluoride diethyl etherate in toluene were added at 80–85° C. The reaction mixture was stirred for another 30 minutes at 85° C., filtered under pressure and concentrated under reduced pressure. A light, hard wax was obtained having a flow point/drop point of 47.7/47.8° C. and a viscosity of 16.2 centistokes.

Example 3

90 grams of stearylglycidyl ether (11.5% of epoxide) and 10 grams of p,p'-isopropylidenediphenyl diglycidyl ether (15.9% of epoxide) were melted while stirring. During the course of about 20 minutes 0.8 milliliter of a 50% by weight solution of boron trifluoride diethyl etherate in toluene was dropped into the melt at 60 to 65° C. while cooling. The reaction mixture was stirred for another 20 minutes at 70° C., the catalyst was destroyed by adding 0.55 gram of aqueous sodium hydroxide solution of 20% strength, a water jet vacuum was applied for a short period of time and the mixture was filtered under pressure. A light, hard wax was obtained having a flow point/drop point of 48.0/48.1° C. and a viscosity of 59.1 centistokes.

Example 4

90 grams of stearylglycidyl ether (11.5% of epoxide) and 10 grams of p,p'-isopropylidene diphenyl diglycidyl ether (15.9% of epoxide) were melted while stirring. 2.5 grams of aluminum isopropylate were added, the reaction mixture was stirred for 40 hours at 120° C. and then filtered under pressure. A light, hard wax was obtained having a flow point/drop point of 47.0/47.1° C. and a viscosity of 34.7 centistokes.

Example 5

87.5 grams of stearylglycidyl ether (11.5% of epoxide) and 12.5 grams of p,p'-isopropylidene diphenyl diglycidyl ether (15.9% of epoxide) were melted while stirring. During the course of about 30 minutes 0.54 milliliter of a 50% by weight solution of boron trifluoride diethyl etherate in dioxane was dropped into the melt at 55 to 60° C. The reaction mixture was stirred for a further 20 minutes at 70° C., the catalyst was destroyed by adding 2.4 grams of aqueous sodium hydroxide solution of 10% strength, a water jet vacuum was applied for a short period of time and the reaction mixture was filtered under pressure. A light, hard wax was obtained having a flow point/drop point of 47.3/47.4° C. and a viscosity of 136.5 centistokes.

Example 6

85 grams of stearylglycidyl ether (11.5% of epoxide) and 15 grams of p,p'-isopropylidene diphenyl diglycidyl ether (15.9% of epoxide) were dissolved in 50 milliliters of toluene while stirring. During the course of about 40 minutes 0.65 milliliter of a 50% by weight solution of boron trifluoride diethyl etherate in dioxane was dropped into the solution at 55 to 60° C. The reaction mixture was stirred for a further 20 minutes at 70° C. and the catalyst was destroyed by adding 2.82 grams of aqueous sodium hydroxide solution of 10% strength. The solvent and water were removed under reduced pressure, the reaction product was taken up in benzene, filtered under pressure and concentrated under reduced pressure. A light, hard wax was obtained having a flow point/drop point of 45.5/45.7° C. and a viscosity of 231.2 centistokes.

Example 7

To measure the gloss of the respective wax films each time 11 grams of wax and 4 grams of a terpene resin (Carboresin T115® of Farbwerke Hoechst, Germany) were dissolved in 85 grams of trichloroethylene. The solutions were applied to black linoleum and after drying the films were polished by hand. The measurements with the gloss meter according to Dr. G. Lange, Berlin, gave the following results:

| Wax film from: | Gloss number |
|---|---|
| Polymeric stearylvinyl ether | 55 |
| Polymeric stearylglycidyl ether | 25 |
| Copolymer of Examples: | |
| 1 | 50 |
| 2 | 48 |
| 3 | 48 |
| 4 | 47 |
| 5 | 65 |
| 6 | 78 |

What is claimed is:

1. Organic solvent soluble protective hard wax obtained by copolymerizing mixtures consisting of about 100 parts by weight of a glycidyl ether of aliphatic fatty alcohols having from 16 to 30 carbon atoms, and about 2 to 20 parts by weight of a diglycidyl ether of dihydric phenols having from 6 to 15 carbon atoms.

2. The wax of claim 1 wherein the dihydric phenol component of the diglycidyl ether is an alkyl substituted dihydric phenol having an alkyl moiety of 1–3 carbon atoms.

3. The wax of claim 1 wherein the dihydric phenol component of the diglycidyl ether is a mononuclear dihydric phenol.

4. The wax of claim 1 wherein the dihydric phenol component of the diglycidyl ether is a polynuclear dihydric phenol.

5. The wax of claim 1 wherein the dihydric phenol component of the diglycidyl ether is a dihydric phenol with condensed nuclei.

6. The wax of claim 1 wherein the dihydric phenol component of the diglycidyl ether is p,p'-isopropylidenediphenol and the copolymerization is effected in the presence of a catalyst.

References Cited

UNITED STATES PATENTS

| | | |
|---|---|---|
| 2,668,807 | 2/1954 | Greenlee. |
| 3,102,893 | 9/1963 | Gaertner. |
| 3,260,687 | 7/1966 | Postol. |

FOREIGN PATENTS

| | | |
|---|---|---|
| 157,643 | 7/1954 | Australia. |

BERNARD HELFIN, Primary Examiner

U.S. Cl. X.R.

106—10; 260—571, 591, 607, 609